United States Patent
Watanabe (10) Patent No.: US 7,259,998 B2
(45) Date of Patent: Aug. 21, 2007

(54) METHOD FOR CONTROLLING MEMORIES OF A PLURALITY OF KINDS AND CIRCUIT FOR CONTROLLING MEMORIES OF A PLURALITY OF KINDS

(75) Inventor: Takatoshi Watanabe, Yamanashi (JP)

(73) Assignee: NEC Corporation, Tokyo (JP)

( * ) Notice: Subject to any disclaimer, the term of this patent is extended or adjusted under 35 U.S.C. 154(b) by 175 days.

(21) Appl. No.: 11/205,221

(22) Filed: Aug. 17, 2005

(65) Prior Publication Data

US 2006/0041714 A1 Feb. 23, 2006

(30) Foreign Application Priority Data

Aug. 19, 2004 (JP) ............................. 2004-239079

(51) Int. Cl.
*G11C 7/10* (2006.01)
(52) U.S. Cl. ...................... 365/189.01; 365/189.12; 711/111; 711/167
(58) Field of Classification Search .......... 365/189.01, 365/189.12; 711/111, 167
See application file for complete search history.

(56) References Cited

U.S. PATENT DOCUMENTS 6,335,904 B1 * 1/2002 Tsuchida et al. ............ 365/233
6,629,224 B1 * 9/2003 Suzuki et al. ............... 711/167

FOREIGN PATENT DOCUMENTS

| JP | H08-137744 A | 5/1996 |
|---|---|---|
| JP | H09-016466 A | 1/1997 |
| JP | 2000-173267 A | 6/2000 |
| JP | 2001-028190 A | 1/2001 |
| JP | 2001-117816 A | 4/2001 |
| JP | 2002-251320 A | 9/2002 |
| JP | 2003-015949 A | 1/2003 |
| JP | 2003-059263 A | 2/2003 |
| WO | WO98/56004 A1 | 12/1998 |

* cited by examiner

*Primary Examiner*—Anh Phung
*Assistant Examiner*—Toan Le
(74) *Attorney, Agent, or Firm*—Sughrue Mion, PLLC

(57) ABSTRACT

It is made possible to control RAMs of a plurality of kinds differing in control system by using a single memory controller (LSI). A memory control circuit having an LSI configuration receives a RAM access request signal, which does not depend on a classification of a RAM device, from a high rank control unit such as a CPU (not shown), and transmits a RAM control signal & data group to a subordinate RAM device to control it. Upon receiving the RAM access request signal, the memory access RAM busy management circuit generates RAM control command & data suitable for the currently connected RAM device, and transmits it to the memory access common control circuit. Upon receiving the RAM control command & data, the memory access common control circuit generates RAM control signal & data group and transmits it to the RAM device.

19 Claims, 8 Drawing Sheets

| 34 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 8 |
|---|---|---|---|---|---|---|---|---|---|---|---|---|---|---|---|---|---|---|---|---|---|---|---|---|---|---|---|---|
| PIN to be used | CLK | CLK' | CS' | RAS' | CAS' | WE' | CKE | BA0 | BA1 | A0 | A1 | A2 | A3 | A4 | A5 | A6 | A7 | A8 | A9 | A10 | A11 | A12 | A13 | | DM | DQS | DQS' | DQ0-7 |
| Define 1st | CLK | CLK' | CS' | RAS' | CAS' | WE' | CKE | BA0 | BA1 | RA00 | RA01 | RA02 | RA03 | RA04 | RA05 | RA06 | RA07 | RA08 | RA09 | RA10 | RA11 | RA12 | RA13 | A14 | DM | DQS | DQS' | DQ0-7 |
| 2nd | CLK | CLK' | CS' | RAS' | CAS' | WE' | CKE | BA0 | BA1 | CA00 | CA01 | CA02 | CA03 | CA04 | CA05 | CA06 | CA07 | CA08 | CA09 | AP | × | × | × | | Unused | | | |
| 8BR ACT | CLK | CLK' | "L" | "L" | "H" | "H" | "H" | BA0 | BA1 | A(00) | A(01) | A(02) | A(03) | A(04) | A(05) | A(06) | A(07) | A(08) | A(09) | A(10) | A(11) | A(12) | A(13) | | "L" | QS | QS' | Q0-7 |
| RDA | CLK | CLK' | "L" | "H" | "L" | "H" | "H" | BA0 | BA1 | "0" | "0" | A(14) | A(15) | A(16) | A(17) | A(18) | A(19) | A(20) | A(21) | "H" | "0" | "0" | "0" | | | | | |
| 8BW ACT | CLK | CLK' | "L" | "L" | "H" | "H" | "H" | BA0 | BA1 | A(00) | A(01) | A(02) | A(03) | A(04) | A(05) | A(06) | A(07) | A(08) | A(09) | A(10) | A(11) | A(12) | A(13) | | "L" | DS | DS' | Q0-7 |
| WTA | CLK | CLK' | "L" | "H" | "L" | "L" | "H" | BA0 | BA1 | "0" | "0" | A(14) | A(15) | A(16) | A(17) | A(18) | A(19) | A(20) | A(21) | "H" | "0" | "0" | "0" | | | | | |
| 4BWU ACT | CLK | CLK' | "L" | "L" | "H" | "H" | "H" | BA0 | BA1 | A(00) | A(01) | A(02) | A(03) | A(04) | A(05) | A(06) | A(07) | A(08) | A(09) | A(10) | A(11) | A(12) | A(13) | | "L"–"H" | DS | DS' | Q0-7 |
| WTA | CLK | CLK' | "L" | "H" | "L" | "L" | "H" | BA0 | BA1 | "0" | "0" | A(14) | A(15) | A(16) | A(17) | A(18) | A(19) | A(20) | A(21) | "H" | "0" | "0" | "0" | | | | | |
| 4BWL ACT | CLK | CLK' | "L" | "L" | "H" | "H" | "H" | BA0 | BA1 | A(00) | A(01) | A(02) | A(03) | A(04) | A(05) | A(06) | A(07) | A(08) | A(09) | A(10) | A(11) | A(12) | A(13) | | "H"–"L" | DS | DS' | Q0-7 |
| WTA | CLK | CLK' | "L" | "H" | "L" | "L" | "H" | BA0 | BA1 | "0" | "0" | A(14) | A(15) | A(16) | A(17) | A(18) | A(19) | A(20) | A(21) | "H" | "0" | "0" | "0" | | | | | |
| REF WRA | CLK | CLK' | "L" | "L" | "L" | "H" | "H" | × | × | × | × | × | × | × | × | × | × | × | × | × | × | × | × | | "L" | "Z" | "Z" | "Z" |
| MRS MRS | CLK | CLK' | "L" | "L" | "L" | "L" | "H" | | | | | | | | | | | | | | | | | | "L" | "Z" | "Z" | "Z" |

| | | Control system 1st | | | | Control system 2nd | | | | ADRS system 2nd | | | |
|---|---|---|---|---|---|---|---|---|---|---|---|---|---|---|
| | | CS' | RAS' | CAS' | WE'(FN) | CS' | RAS' | CAS' | WE'(FN) | A0 | A1 | A10 | A13 | A14 |
| FCRAM | Read | L | | | H | | | | H | O | O | O | O | O |
| FCRAM | Full write | L | | | L | | | | H | O | O | O | L | H |
| FCRAM | Upper write | L | | | L | | | | H | O | O | O | H | L |
| FCRAM | Lower write | L | | | L | | | | H | O | 1 | O | H | L |
| FCRAM | REF | L | L | | L | | | | H | X | X | X | X | X |
| FCRAM | MRS | L | L | H | H | | | | H | | | | | |
| DDR2 | Read | L | L | H | H | L | H | L | H | O | O | H | O | |
| DDR2 | Full write | L | L | H | H | L | H | L | L | O | O | H | O | |
| DDR2 | Mask write | L | L | L | H | L | H | L | L | O | O | H | O | |
| DDR2 | REF | L | L | L | H | | | | | | | | | |
| DDR2 | MRS | L | L | L | L | | | | | | | | | |

METHOD FOR CONTROLLING MEMORIES OF A PLURALITY OF KINDS AND CIRCUIT FOR CONTROLLING MEMORIES OF A PLURALITY OF KINDS

BACKGROUND OF THE INVENTION

1. Field of the Invention

The present invention relates to a method for controlling memories such as DRAMs and its memory control circuit. In particular, the present invention relates to a technique for making it possible to control memories of a plurality of kinds differing in control system by using the same controller (memory control circuit).

2. Description of the Related Art

In the DRAM (dynamic random access memory) which is a representative memory, an SDRAM (synchronous DRAM) which conducts operation in synchronism with a clock supplied from the outside has become general. At present, however, the DDR (double data rate)-SDRAM based on the SDRAM which conducts data transfer not only at timing of a rising edge of the clock but also at timing of a falling edge has become the main stream (see, for example, JP-A-2000-173267). This DDR-SDRAM is also being gradually replaced by DDR2-SDRAM which is an improved version of the DDR-SDRAM. Furthermore, the FC (fast cycle)-DRAM which takes in a row address and a column address simultaneously (at consecutive clocks) is also proposed and provided for the market (see, for example, WO98/56004). Typically, the memory such as the DRAM executes an instruction issued by a high rank control unit such as a CPU via an LSI called controller.

On the other hand, in an application device such as a personal computer having a DRAM mounted thereon, it is necessary to provide a device obtained by mounting DRAMs differing in control system, such as the DDR-SDRAM and the FCRAM, on a device of the same device kind in order to meet various needs of users. In such a case, it becomes necessary to develop separate controllers respectively for the DDR-SDRAM and the FCRAM differing from each other in control system.

However, controllers must be developed respectively for different kinds of DRAMs in the same application device. When developing a device with RAMs that are different in control system mounted thereon in order to, for example, increase variations in the same device kind, therefore, the total time and labor required for the development is increased. Furthermore, in the conventional method, design and development of the controllers must be started after the specifications of the DRAMs have been completely fixed. In situations where the development cycles of application devices become short, like the present, therefore, a fear that the development will be delayed occurs. In addition, in the conventional method, it is difficult to flexibly cope with an alteration in DRAM specifications after the controllers have been developed once.

SUMMARY OF THE INVENTION

The subject of the present invention is to solve the problems of the conventional technique. A first object of the present invention is to make it possible to cope with memories of a plurality of kinds differing in control system by using a single controller and shorten the total time and labor required for the development of the controller. A second object of the present invention is to make it possible to develop an application device in parallel with development of a memory to be mounted on the application device and cope with shortening of the development cycle of the application device. A third object is to make it possible to flexibly cope with an alteration in memory specifications without re-developing the controller (LSI).

In order to achieve the object, the present invention provides a method for controlling memories of a plurality of kinds by supplying control signals to the memories and exercising data input and output control, the method including the steps of storing various instructions to be supplied to memories of a plurality of kinds differing in control system, in a memory access common control circuit for supplying control signals to the memories, and successively selecting and outputting the instructions stored in the memory access common control circuit in accordance with an output signal of a memory access management circuit for managing memory access timing.

Furthermore, the present invention provides a memory control circuit for controlling memories of a plurality of kinds by supplying control signals to the memories and exercising data input and output control, the memory control circuit including a memory access management circuit for managing memory access timing, and a memory access common control circuit for supplying control signals to the memories, wherein various instructions to be supplied to memories of a plurality of kinds differing in control system are stored in the memory access common control circuit, and the instructions stored in the memory access common control circuit are successively selected and output in accordance with an output signal of the memory access management circuit.

Preferably, the instruction stored in the memory access common control circuit can be set by software.

When developing an application device of the same device kind on which memories of a plurality of kinds differing in control system are mounted, the present invention makes it possible to implement an LSI (controller) for memory control by using a single LSI kind, reduce the total time and labor required for the development, and eventually reduce the development cost.

And it becomes possible to flexibly cope with alterations in external interface specifications of the memory by making it possible to set various instructions (commands) for the memory in registers in a memory control circuit by using software. Furthermore, it becomes possible to start the controller LSI development earlier.

DESCRIPTION OF THE PREFERRED EMBODIMENTS

Figure 1:
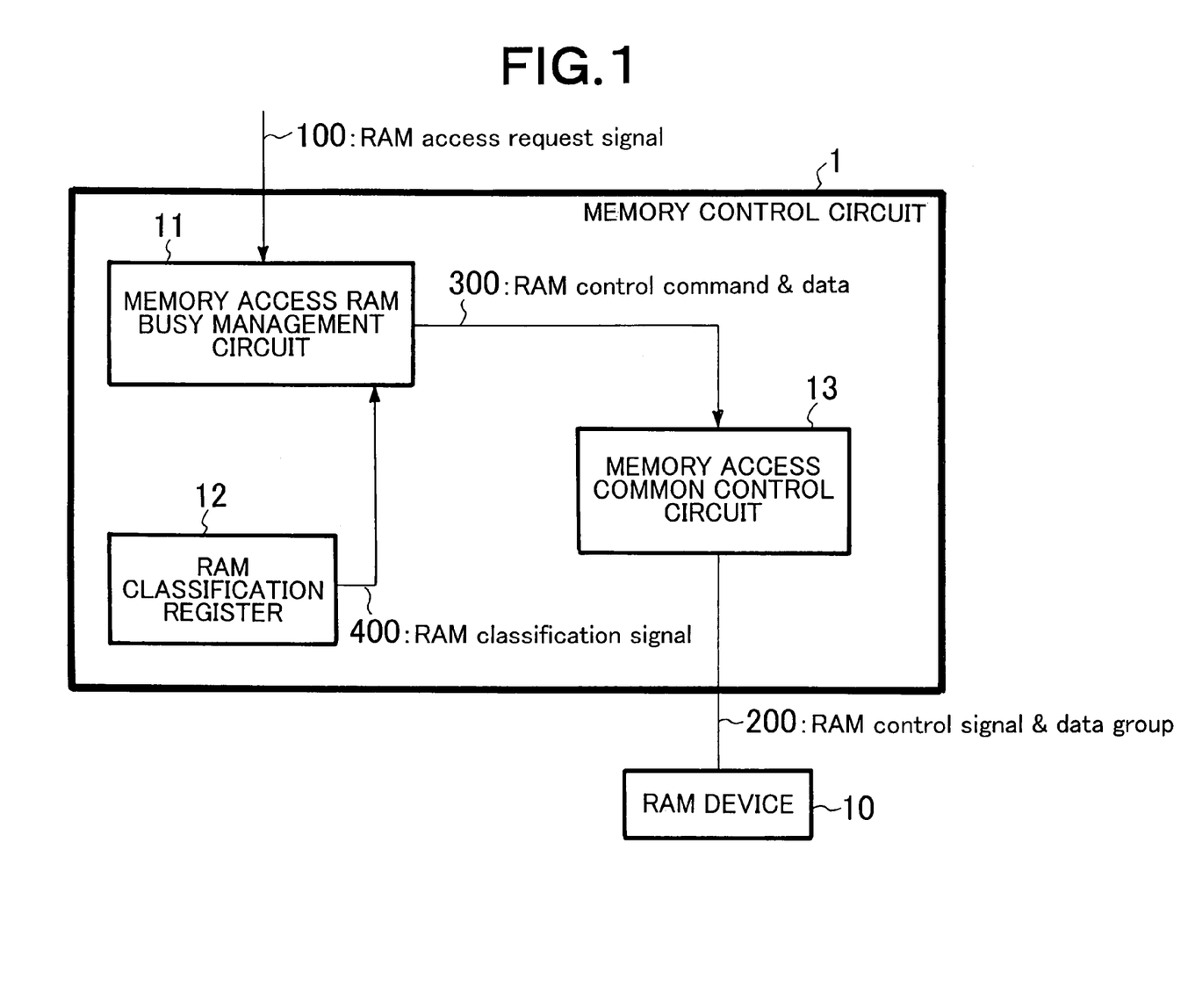
FIG. 1 is a block diagram showing an embodiment of a memory control circuit according to the present invention.

Embodiments of the present invention will now be described with reference to the drawings. FIG. 1 is a block diagram showing a configuration of a memory control circuit according to the present invention. A memory control circuit 1 includes a memory access RAM busy management circuit 11, a RAM classification register 12, and a memory access common control circuit 13. The memory control circuit 1 is constituted as an LSI. The memory control circuit 1 receives a RAM access request signal 100, which does not depend on the classification of a RAM device, from a high rank control unit (not illustrated) such as a CPU, and transmits a RAM control signal & data group 200 to a subordinate RAM device 10 to control it. The RAM access request signal 100 is received by the memory access RAM busy management circuit 11. The memory access RAM busy management circuit 11 refers to a RAM classification signal 400 transmitted from the RAM classification register 12, generates RAM control command & data 300 suitable for the currently connected RAM device 10, and transmits the RAM control command & data 300 to the memory access common control circuit 13. Upon receiving the RAM control command & data 300, the memory access common control circuit 13 generates RAM control signal & data group 200, and transmits the RAM control signal & data group 200 to the RAM device 10.

The memory access RAM busy management circuit 11 to which the RAM access request signal 100 is transmitted from the high rank control unit is a circuit typically used in the conventional controller. The memory access RAM busy management circuit 11 receives the RAM classification signal 400 from the RAM classification register 12, which manages the classification of the RAM device connected to the memory control circuit 1, and exercises control (busy control) on a timing interval of sending a control signal to the RAM according to specifications of the RAM device. In other words, when access to the connected RAM device 10 has become possible, the memory access RAM busy management circuit 11 sends the RAM control command & data 300 to the memory access common control circuit 13. And the memory access common control circuit 13 transmits the RAM control signal & data group 200, which contains a control signal, data and address information, to the RAM device 10.

Figure 2:
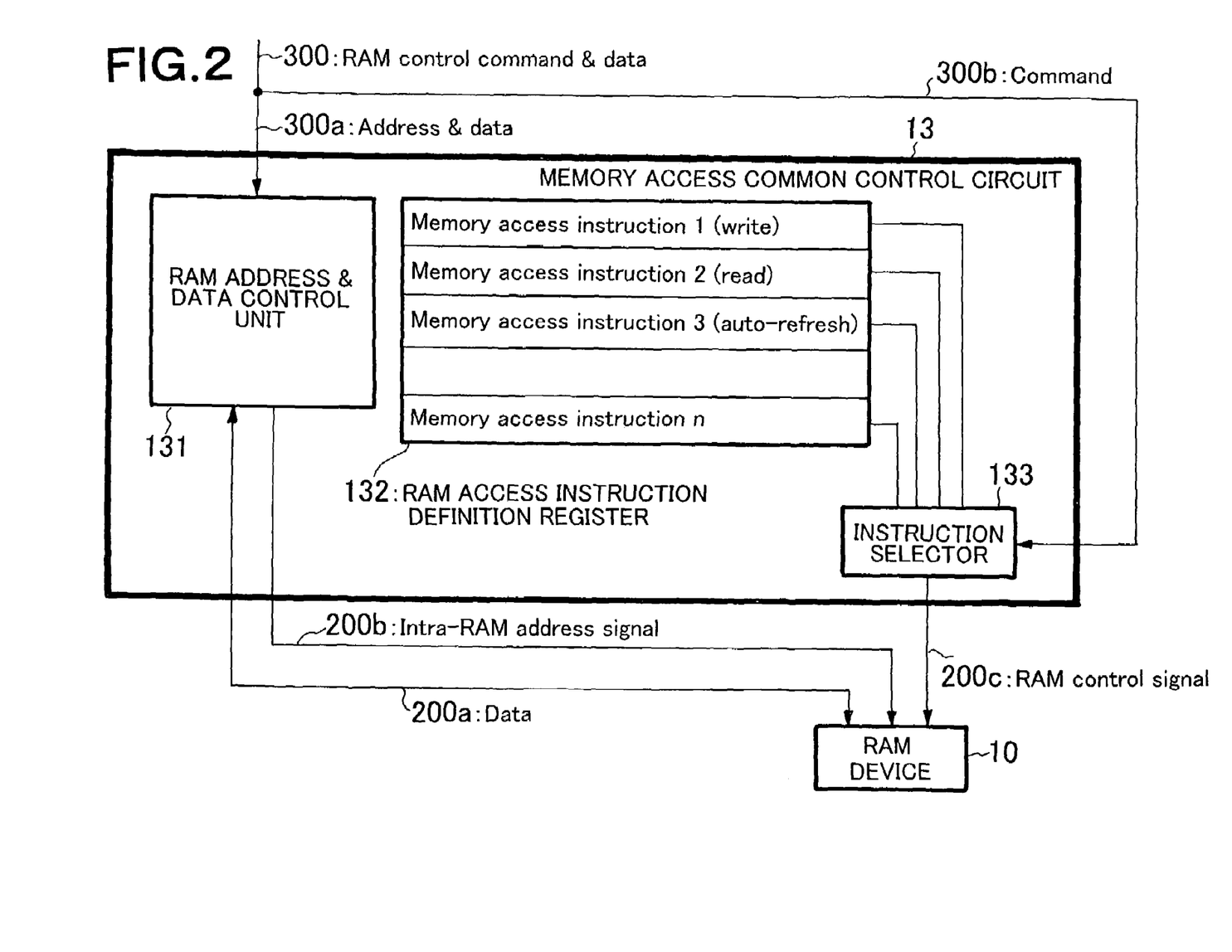
FIG. 2 is a block diagram showing a specific configuration of a memory access common control circuit shown in FIG. 1.

FIG. 2 is a block diagram showing a detailed configuration of the memory access control circuit 13 shown in FIG. 1. The memory access common control circuit 13 receives information required for RAM access [such as the RAM access kind (such as writing, reading or refreshing), an access address in the RAM, and data] as the RAM control command & data 300 sent from the memory access RAM busy management circuit 11 shown in FIG. 1, conducts generation of an interface signal between the RAM device 10 and the memory control circuit 1, and exercises timing control.

As shown in FIG. 2, the memory access common control circuit 13 includes a RAM address & data control unit 131, a RAM access instruction definition register 132, and an instruction selector 133.

The RAM address & data control unit 131 is supplied with address data 300a from among the RAM control command & data 300 sent from the memory access RAM busy management circuit 11. And an inter-RAM address signal 200b and write data are transmitted from the RAM address & data control unit 131 to the RAM device 10. Read data from the RAM device 10 is sent to the RAM address & data control unit 131. Instructions (commands) required to control RAM devices differing in control system are previously registered in the RAM access instruction definition register 132. In other words, instructions associated with respective RAMs including a write instruction, a full write instruction, a mask write instruction, a refresh instruction (REF) and a mode register set (MRS) instruction are previously registered in the RAM access instruction definition register 132. A command 300b in the RAM control command & data 300 sent from the memory access RAM busy management circuit 11 is sent to the instruction selector 133. The instruction selector 133 selects an instruction registered in the RAM access instruction definition register 132 on the basis of the command 300b, at its sending timing, and outputs the selected instruction toward the RAM device 10 as a RAM control signal 200c. In other words, the instruction selector 133 outputs instructions registered in the RAM access instruction definition register 132 toward the RAM device 10 one after another. The output timing is controlled by the memory access RAM busy management circuit 11.

EXAMPLE

Figure 3:
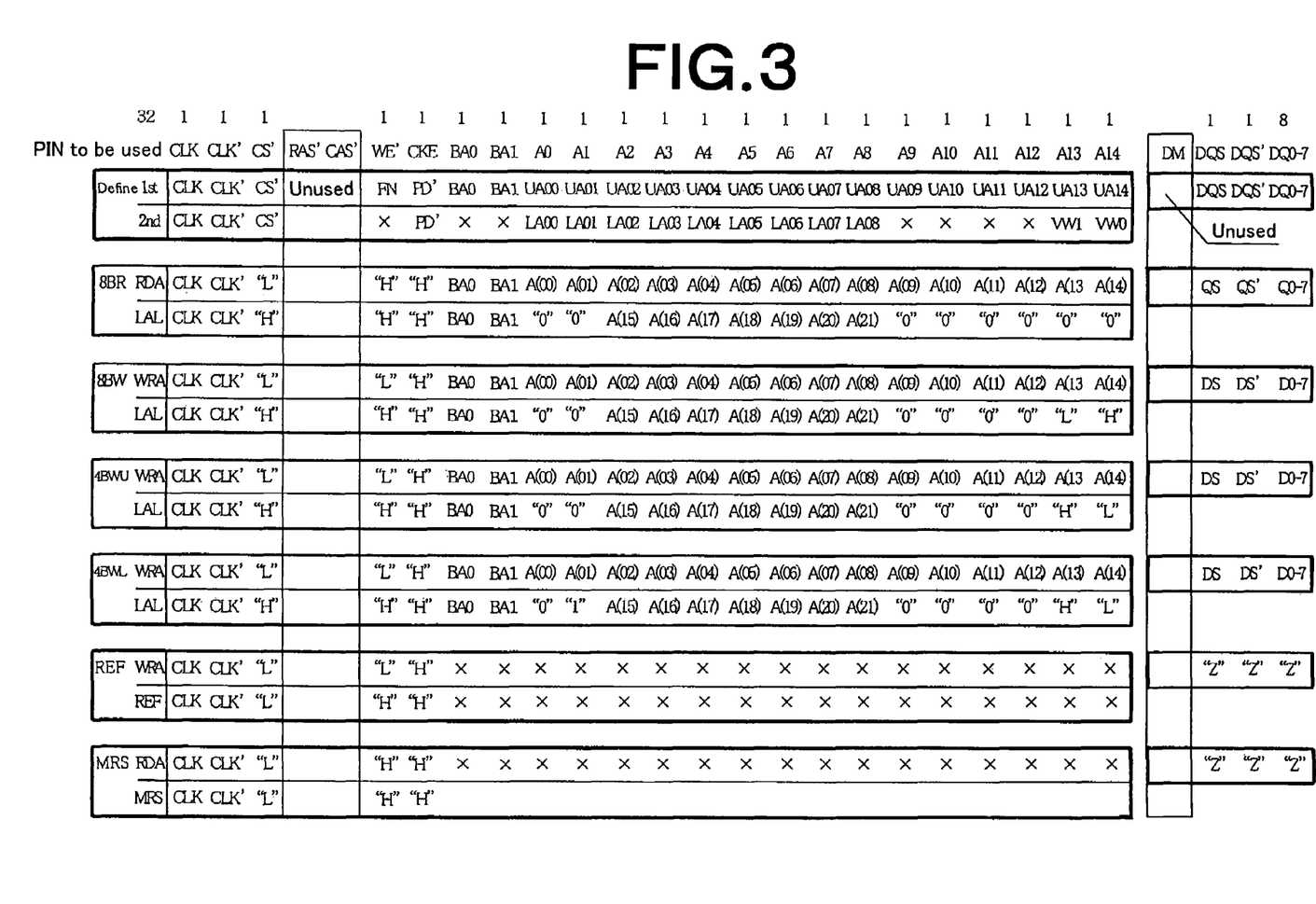
FIG. 3 is a diagram showing pin-signal assignment in an FCRAM connected to a memory control circuit in an example of the present invention.

An example obtained by applying the present invention to a DRAM will now be described. The memory control circuit in the present example can exercise compatible control on the FCRAM and the DDR2-SDRAM. FIG. 3 is a diagram showing pin names and their signal assignments in the FCRAM controlled by the memory control circuit in an example of the present invention. In the FCRAM used in the present example, pins CLK, CLK', CS', WE', CKE, BA0, BA1, A0 to A14, DQS, DQS', and DQ0 to DQ7 are used. Clocks CLK and CLK' are input to the CLK pin and the CLK' pin, respectively. A CS' signal is input to the CS' pin. An FN signal is input to the WE' pin. In the present example, a power down command PD' is input to the CKE pin. (In the present example, the power down command is not originated and consequently the CKE pin is fixed to a high level.) Bank addresses BA0 and BA1 are input to the BA0 pin and the BA1 pin, respectively. Upper addresses UA00 to UA14 are respectively input to the A0 to A14 pins at the time of a 1st command. At the time of a 2nd command, lower addresses LA00 to LA08 are respectively input to the A0 to A8 pins and variable write signals VW1 and VW0 are respectively input to the A13 pin and A14 pin. (VW1 and VW0 are input only at the time of write command origination.) Data strobe signals DQS and DQS' are input to and output from the DQS pin and DQS' pin, respectively. Data DQ0 to DQ7 are input to and output from the DQ0 to DQ7 pins, respectively.

When conducting reading on the FCRAM (by using a read command 8BR shown in FIG. 3), the CS' signal goes "L" and the FN signal goes "H" at the time of 1st command and consequently an RDA (read with auto-close) command is issued. At the same time, the band addresses BA0 and BA1 are taken in respectively from the BA0 pin and the BA1 pin, and upper addresses A(00) to A(14) are taken in respectively from the A0 pin to A14 pin. At the time of the 2nd command, the CS' signal goes "H" and the FN signal goes "H" and consequently a LAL (lower address latch) command is issued. At the same time, lower addresses A(15) to A(21) are taken in from the A2 pin to A8 pin, respectively. As a result, information stored in a cell of a specific address is read out via DQ0 to DQ7 pins.

When conducting full writing on the FCRAM (by using a full write command 8BW shown in FIG. 3), the CS' signal goes "L" and the FN signal goes "L" at the time of 1st command and consequently a WRA (write with auto-close) command is issued. At the same time, the band addresses BA0 and BA1 are taken in respectively from the BA0 pin and the BA1 pin, and upper addresses A(00) to A(14) are taken in respectively from the A0 pin to A14 pin. At the time of the 2nd command, the CS' signal goes "H" and the FN signal goes "H" and consequently the LAL command is issued. At the same time, lower addresses A(15) to A(21) are taken in from the A2 pin to A8 pin, respectively. Information "L" and "H" indicating full writing is taken in from the A13 pin and A14 pin. As a result, data supplied via the DQ0 to DQ7 pins is written into a cell having a specific address.

Commands used when conducting upper writing or lower writing, which is mask writing, on the FCRAM (by using an upper write command 4BWU or a lower write command 4BWL shown in FIG. 3) are the same as those used at the time of full writing except that information "H" and "L" indicating the mask writing is supplied to the A13 pin and the A14 pin at the time of the 2nd command. The mask place for the upper write or the lower write are indicated via the A0 pin and the A1 pin at the time of 2nd command.

When conducting refreshing on the FCRAM, the CS' signal goes "L" and the FN signal goes "L" at the time of the 1st command and consequently the WRA command is issued. At the time of the 2nd command, the CS' signal goes "L" and the FN signal goes "H" and consequently an REF (auto refresh) command is issued and refreshing is conducted.

When conducting mode register setting on the FCRAM, the CS' signal goes "L" and the FN signal goes "H" at the time of the 1st command and consequently the RDA command is issued. At the time of the 2nd command, the CS' signal goes "L" and the FN signal goes "H" and consequently a MRS (mode register set) command is issued. And at the time of the 2nd command, information concerning the mode to be set is supplied from address pins.

When issuing the REF command or the MRS command, the DQS, DQS' and DQ0 to DQ7 pins are placed in the high impedance state.

Figure 4:
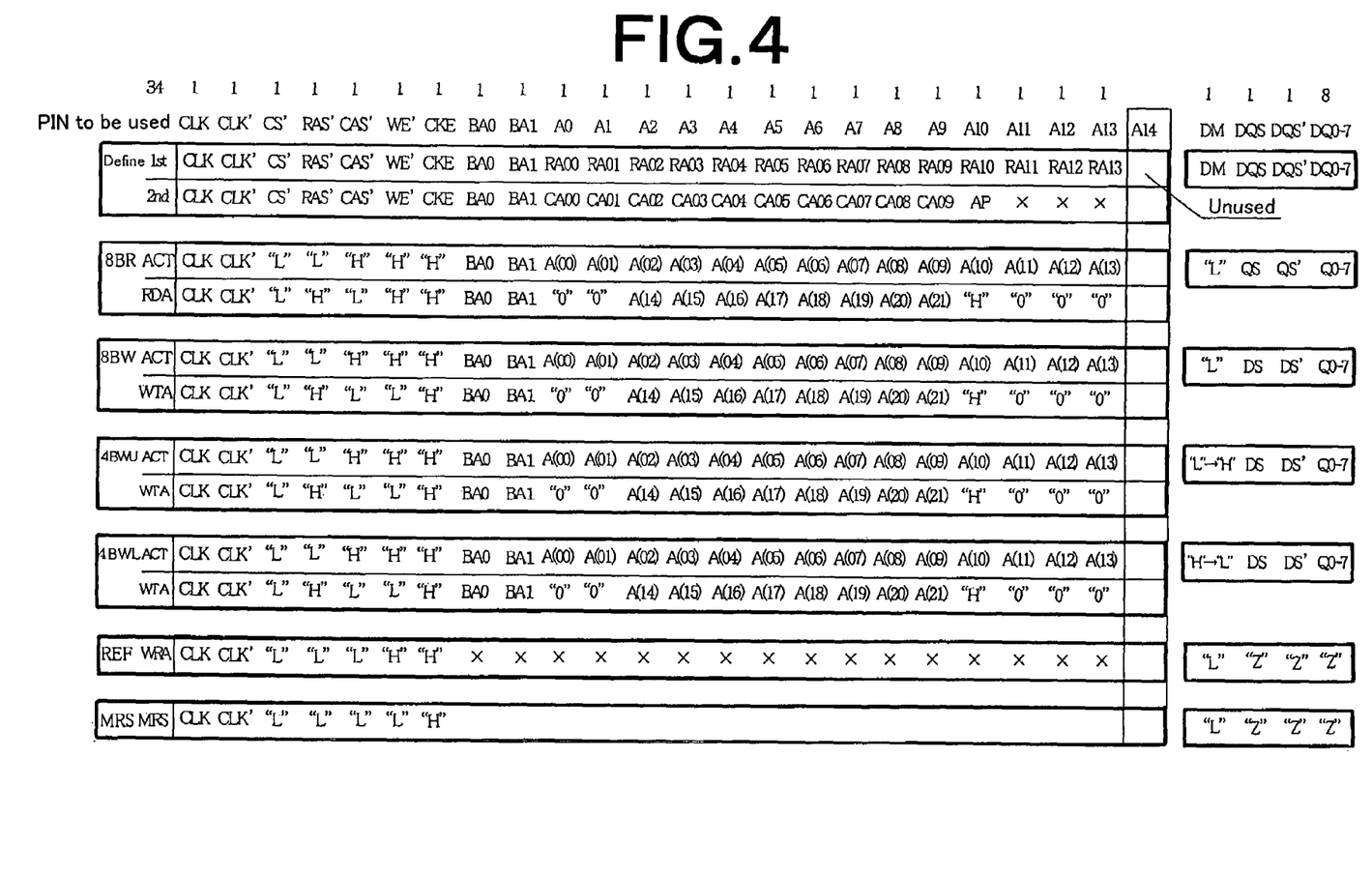
FIG. 4 is a diagram showing pin-signal assignment in a DDR2-SDRAM connected to a memory control circuit in an example of the present invention.

FIG. 4 is a diagram showing pin names and their signal assignments in the DDR2-SDRAM controlled by the memory control circuit in the example of the present invention. In the DDR2-SDRAM used in the present example, pins CLK, CLK', CS', RAS', CAS', WE', CKE, BA0, BA1, A0 to A13, DM, DQS, DQS', and DQ0 to DQ7 are used. The clocks CLK and CLK' are input to the CLK pin and the CLK' pin, respectively. A CS' signal is input to the CS' pin. An RAS' signal and a CAS' signal are input to the RAS' pin and the CAS' pin. A WE' signal is input to the WE' pin. A clock enable signal CKE fixed to the high level in the present example is input to the CKE pin. Bank addresses BA0 and BA1 are input to the BA0 pin and the BA1 pin, respectively. Row addresses RA00 to RA13 are respectively input to the A0 to A13 pins at the time of a 1st command. At the time of a 2nd command, column addresses CA00 to CA09 are respectively input to the A0 to A9 pins and an auto precharge signal AP is input to the A10 pin. A data mask signal DM is input to the DM pin. Data strobe signals DQS and DQS' are input to and output from the DQS pin and DQS' pin, respectively. Data DQ0 to DQ7 are input to and output from the DQ0 to DQ7 pins, respectively.

When conducting reading on the DDR2-SDRAM, the CS' signal goes "L" and the RAS signal goes "H" at the time of 1st command and consequently an ACT (active) command is issued. At the same time, the band addresses BA0 and BA1 are taken in respectively from the BA0 pin and the BA1 pin, and row addresses A(00) to A(13) are taken in respectively from the A0 pin to A13 pin. At the time of the 2nd command, the CS' signal, the CAS' signal and the AP signal respectively go "L", "L" and "H" and consequently the RDA (read with auto precharge) command is issued. At the same time, column addresses A(14) to A(21) are taken in from the A2 pin to A9 pin, respectively. As a result, information stored in a cell of a specific address is read out via DQ0 to DQ7 pins.

When conducting full writing on the DDR2-SDRAM, operation conducted at the time of the 1st command is the same as that at the time of the 1st command when conducting reading. In other words, the ACT command is issued, and the band addresses BA0 and BA1 and row addresses A(00) to A(13) are taken in. At the time of the 2nd command, the CS' signal, the CAS' signal, the WE' signal and the AP signal respectively go "L", "L", "L" and H" and consequently a WTA (write with auto precharge) command is issued. At the same time, column addresses A(14) to A(21) are taken in from the A2 pin to A9 pin, respectively. As a result, data supplied via the DQ0 to DQ7 pins are written into a cell of a specific address.

Commands used when conducting upper writing or lower writing, which is mask writing, on the DDR2-SDRAM are the same as those used at the time of full writing except that information "L→H" and "H→L" indicating the mask writing is supplied to the DM pin.

When conducting refreshing on the DDR2-SDRAM, the CS' signal, the RAS' signal and the CAS' signal respectively go "L", "L" and l"L" and consequently the REF command is issued. After completion of refreshing, a return to the standby state is conducted.

When conducting mode register setting on the DDR2-SDRAM, the CS' signal, the RAS' signal, the CAS' signal, and the WE' signal respectively go "L", "L", "L" and "L" and consequently the MRS command is issued. At this time, information concerning the mode to be set is supplied from the address pins.

When issuing the REF command or the MRS command, the DQS, DQS' and DQ0 to DQ7 pins are placed in the high impedance state.

Figure 5:
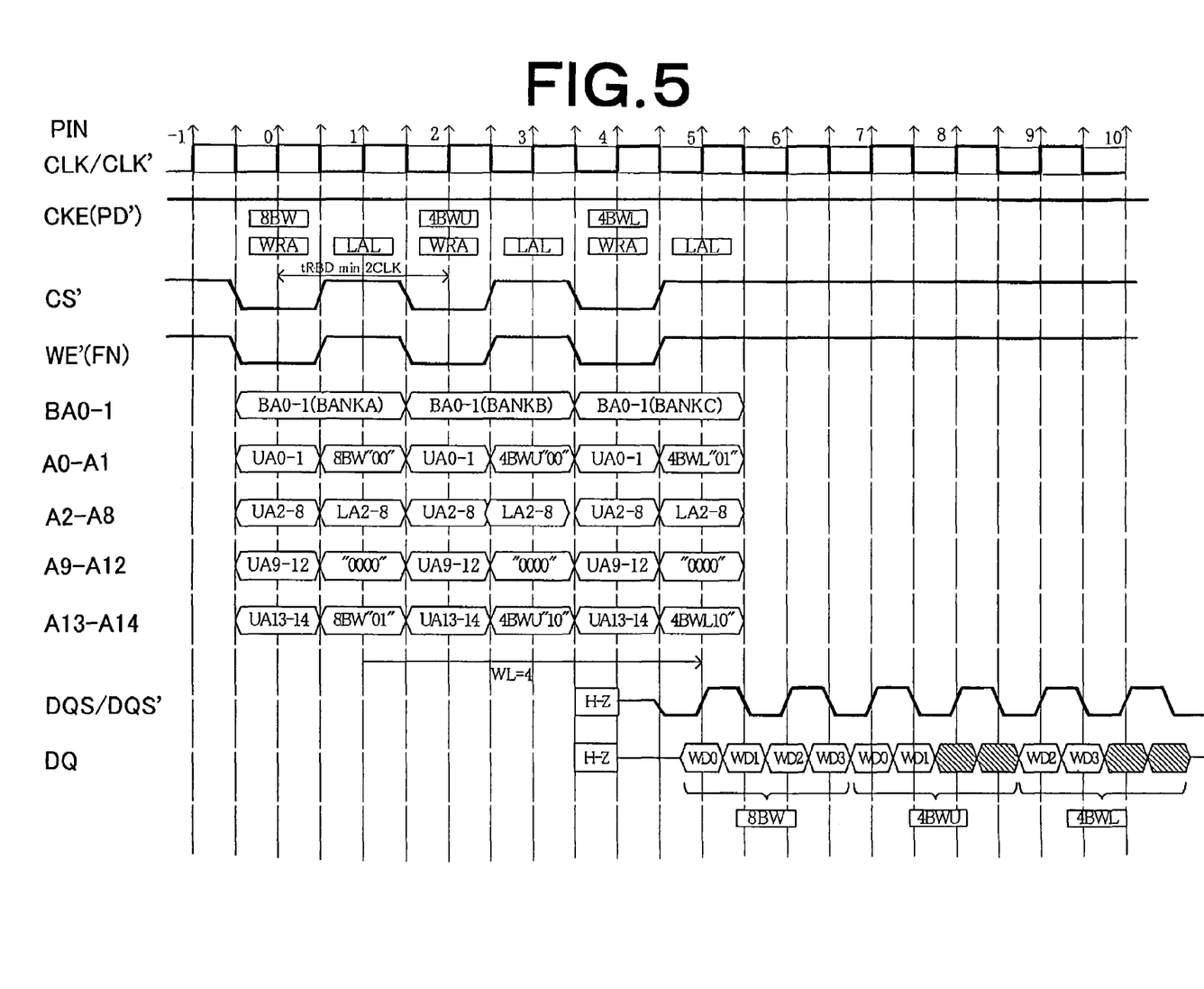
FIG. 5 is a diagram showing signal waveforms at the time of writing in an FCRAM connected to a memory control circuit in an example of the present invention.

FIG. 5 is a time chart showing operation waveforms at respective pins at the time when writing data into the FCRAM which operates according to the signal assignment shown FIG. 3. In this example, BL (burst length) is set equal to 4 and WL (write latency) is set equal to 4. In a CLK cycle 0T, the full write command (8BW) is input. In a CLK cycle 2T, the upper write command (4BWU) is input. In a CLK cycle 4T, the lower write command (4BWL) is input.

In a CLK cycle 0T in which the 1st command of the 8BW is input, both CS' and FN go "L" and the WRA command is issued. At the same time, the bank addresses BA0 and BA1 and the upper addresses UA0 to UA14 are taken in. In a CLK cycle 1T in which the 2nd command of 8BW is input, both CS' and FN go "H" and the LAL command is issued. At the same time, the lower addresses LA2 to UA8 are taken in. (At the time of the 2nd command of the 8BW, the A0 and A1 pins are fixed to "0," and "L" and "H" indicating the full writing are input to the A13 and A14 pins.) In the FCRAM in the present example, WL is WL=4. In a CLK cycle 5T occurring four clocks after the 2nd command input of the 8BW, therefore, reading of first write data WD0 is conducted and data writing is conducted. Since BL=4, reading of write data is conducted thereafter every half clock up to WD3, and writing of the data is conducted.

As for the 4BWU and 4BWL executed after the 8BW as well, the same operation as that in the full write 8BW is conducted except the mask writing is executed by inputting a mask write indicating signal from the A13 and A14 pins and inputting mask position indicating information from the A0 and A1 pins.

Figure 6:
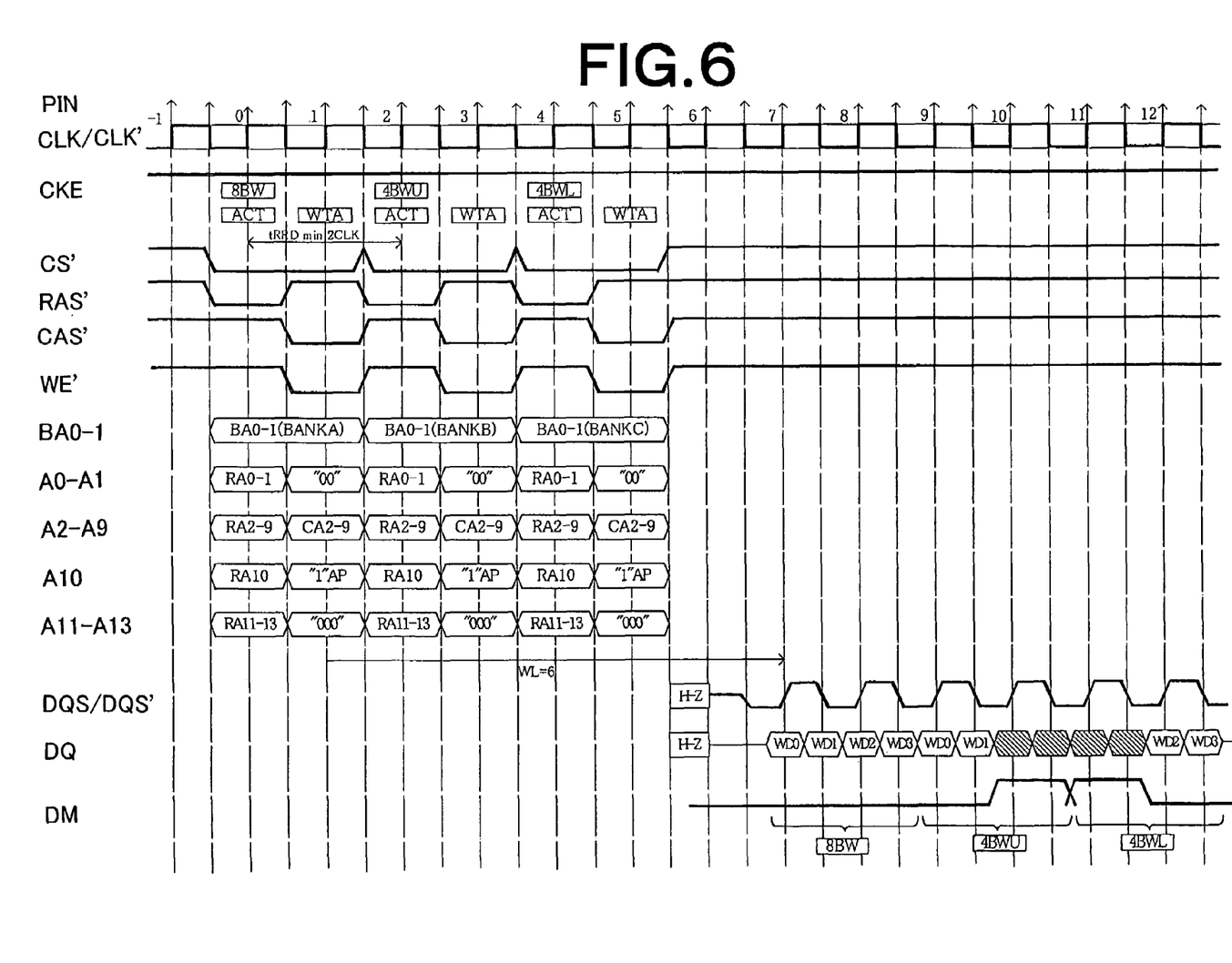
FIG. 6 is a diagram showing signal waveforms at the time of writing in a DDR2-SDRAM connected to a memory control circuit in an example of the present invention.

FIG. 6 is a time chart showing operation waveforms at respective pins at the time when writing data into the DDR2-SDRAM which operates according to the signal assignment shown FIG. 4. In this example, BL is set equal to 4 and WL is set equal to 6. In a CLK cycle 0T, the full write command (8BW) is input. In a CLK cycle 2T, the upper write command (4BWU) is input. In a CLK cycle 4T, the lower write command (4BWL) is input.

In a CLK cycle 0T in which the 1st command of the 8BW is input, CS' and RAS' go "L" and the ACT command is issued. At the same time, the bank addresses BA0 and BA1 and the row addresses RA0 to RA13 are taken in. In a CLK cycle 1T in which the 2nd command of 8BW is input, CS', CAS' and WE' go "L" and the WTA command is issued. At the same time, the column addresses CA2 to CA9 are taken in. (At this time, the A0 and A1 pins are fixed to "0," and an "H" indicating execution of the auto precharging is input to the A10 pin.) In the DDR2-SDRAM in the present example, WL is WL=4. In a CLK cycle 7T occurring six clocks after the 2nd command input of the 8BW, therefore, reading of first write data WD0 is conducted and data writing is conducted. Since BL=4, reading of write data is conducted thereafter every half clock up to WD3, and writing of the data is conducted.

As for the 4BWU and 4BWL executed after the 8BW as well, the same operation as that in the 8BW is conducted except the mask writing is executed. Timing of write data masking is ordered by the DM signal.

Figure 7:
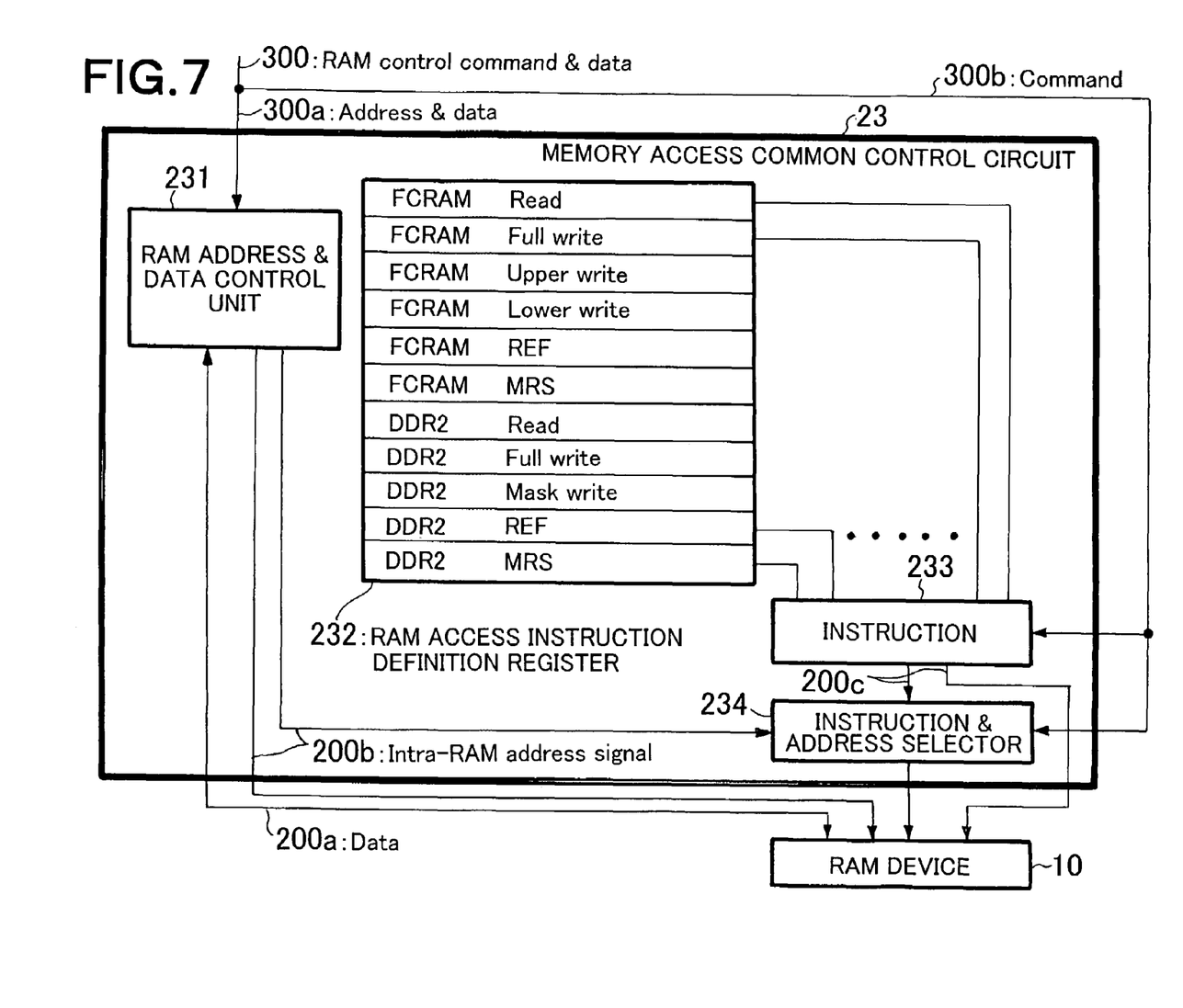
FIG. 7 is a block diagram showing a configuration of a memory access common control circuit installed in a memory control circuit in an example of the present invention.

FIG. 7 is a block diagram of the memory access common control circuit installed in the memory control circuit in the present example. The RAM device 10 connected to a memory access common control circuit 23 is the FCRAM or the DDR2-SDRAM described with reference to FIGS. 3 to 6. The memory access common control circuit 23 includes a RAM address & data control unit 231, a RAM access instruction definition register 232, an instruction selector 233, and an instruction & address selector 234. The RAM address & data control unit 231 is supplied with address data 300a from among the RAM control command & data 300. Inputting and outputting of data 200a are conducted between the RAM address & data control unit 231 and the RAM device 10. The RAM address & data control unit 231 outputs an intra-RAM address signal 200b. Various instructions of the RAM connected to the memory control circuit in the present example, i.e., various instructions of the FCRAM and the DDR2-SDRAM are stored in the RAM access instruction definition register 232. In other words, a read instruction (8BR), a full write instruction (8BW), an upper write instruction (4BWU), a lower write instruction (4BWL), an auto refresh instruction (REF) and a mode register set instruction (MRS) for the FCRAM, and a read instruction (8BR), a full write instruction (8BW), a mask write instruction (4BWU, 4BWL), an auto refresh instruction (REF) and a mode register set instruction (MRS) for the DDR2-SDRAM are set. It is possible to alter the setting contents by using software from the outside of the present memory control circuit (LSI). A command 300b in the RAM control command & data 300 is input to the instruction selector 233. The instruction selector 233 selects an instruction registered in the RAM access instruction definition register 232 in accordance with the command 300b, and outputs the selected instruction as a RAM control signal 200c. A part (signals at A0, A1, A10, A13 and A14 pins) of the intra-RAM address signal 200b and a part (address control signal) of the RAM control signal 200c are input to the instruction & address selector 234. The instruction & address selector 234 outputs either of them toward the RAM device 10 in accordance with the command 300b.

The contents of the RAM access instruction definition register 232 may be adapted to be set by setting dip switches or programming programmable elements.

Figure 8:
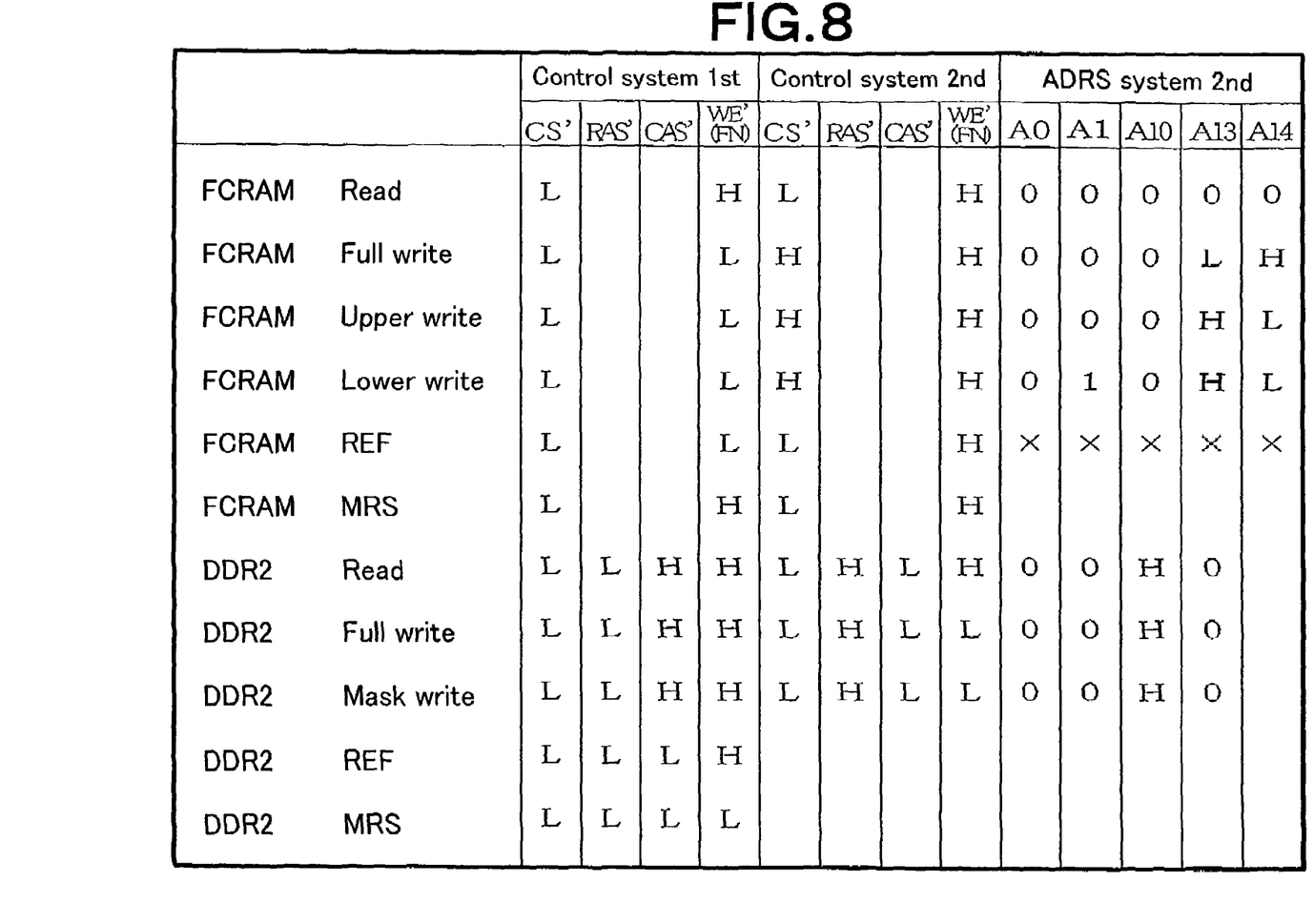
FIG. 8 is a diagram showing a specific configuration of a RAM access instruction register in a memory access common control circuit shown in FIG. 7.

FIG. 8 is a diagram showing a specific registration example of the RAM access instruction definition register 232 shown in FIG. 7. Registration is conducted beforehand as shown in FIG. 8 in accordance with signal assignments of respective pins shown in FIGS. 3 and 4.

What is claimed is:

1. A method for controlling memories of a plurality of kinds by supplying control signals to the memories and exercising data input and output control, the method comprising the steps of:
    storing various instructions to be supplied to memories of a plurality of kinds differing in control system, in a memory access common control circuit for supplying control signals to the memories; and
    successively selecting and outputting the instructions stored in the memory access common control circuit in accordance with an output signal of a memory access management circuit for managing memory access timing.

2. The method for controlling memories of a plurality of kinds according to claim 1, further comprising the step of inputting a signal indicating a classification of a connected memory to the memory access management circuit, from a memory classification register for storing classifications of connectable memories.

3. The method for controlling memories of a plurality of kinds according to claim 1, wherein the memory access common control circuit outputs an instruction stored in an instruction definition register for storing the various instructions, via an instruction selector controlled by the output signal of the memory access management circuit.

4. The method for controlling memories of a plurality of kinds according to claim 2, wherein the memory access common control circuit outputs an instruction stored in an instruction definition register for storing the various instructions, via an instruction selector controlled by the output signal of the memory access management circuit.

5. The method for controlling memories of a plurality of kinds according to claim 3, wherein the memory access common control circuit outputs memory address information and conducts data inputting and outputting, by using an address & data control unit included in the memory access common control circuit.

6. The method for controlling memories of a plurality of kinds according to claim 4, wherein the memory access common control circuit outputs memory address information and conducts data inputting and outputting, by using an address & data control unit included in the memory access common control circuit.

7. A memory control circuit for controlling memories of a plurality of kinds by supplying control signals to the memories and exercising data input and output control, the memory control circuit comprising:
- a memory access management circuit for managing memory access timing; and
- a memory access common control circuit for supplying control signals to the memories, wherein various instructions to be supplied to memories of a plurality of kinds differing in control system are stored in the memory access common control circuit, and the instructions stored in the memory access common control circuit are successively selected and output in accordance with an output signal of the memory access management circuit.

8. The memory control circuit for controlling memories of a plurality of kinds according to claim 7, further comprising a memory classification register for storing classifications of connectable memories, wherein a signal indicating a classification of a connected memory is input to the memory access management circuit.

9. The memory control circuit for controlling memories of a plurality of kinds according to claim 8, wherein the memory access common control circuit comprises an instruction definition register for storing the various instructions, wherein an instruction stored in the instruction definition register is output via an instruction selector controlled by the output signal of the memory access management circuit.

10. The memory control circuit for controlling memories of a plurality of kinds according to claim 9, wherein the memory access common control circuit further comprises an address & data control unit for outputting memory address information and conducting data inputting and outputting.

11. The memory control circuit for controlling memories of a plurality of kinds according to claim 10, wherein the memory access common control circuit further comprises an instruction & address selector supplied with a part of the instruction output from the instruction selector and a part of the address information output from the address & data control unit, and the instruction or address information is selected by the output signal of the memory access management circuit and output from the instruction & address selector.

12. The memory control circuit for controlling memories of a plurality of kinds according to claim 9, wherein the instructions stored in the instruction definition register can be altered from outside.

13. The memory control circuit for controlling memories of a plurality of kinds according to claim 9, wherein the instructions stored in the instruction definition register can be set by software.

14. The memory control circuit for controlling memories of a plurality of kinds according to claim 7, wherein the circuits are integrated on a single chip as an LSI.

15. The memory control circuit for controlling memories of a plurality of kinds according to claim 7, wherein the memory access common control circuit comprises an instruction definition register for storing the various instructions, wherein an instruction stored in the instruction definition register is output via an instruction selector controlled by the output signal of the memory access management circuit.

16. The memory control circuit for controlling memories of a plurality of kinds according to claim 15, wherein the memory access common control circuit further comprises an address & data control unit for outputting memory address information and conducting data inputting and outputting.

17. The memory control circuit for controlling memories of a plurality of kinds according to claim 16, wherein the memory access common control circuit further comprises an instruction & address selector supplied with a part of the instruction output from the instruction selector and a part of the address information output from the address & data control unit, and the instruction or address information is selected by the output signal of the memory access management circuit and output from the instruction & address selector.

18. The memory control circuit for controlling memories of a plurality of kinds according to claim 15, wherein the instructions stored in the instruction definition register can be altered from outside.

19. The memory control circuit for controlling memories of a plurality of kinds according to claim 15, wherein the instructions stored in the instruction definition register can be set by software.

* * * * *